United States Patent Office
3,127,236
Patented Mar. 31, 1964

3,127,236
PROCESS FOR SEPARATING ZIRCONIUM AND HAFNIUM VALUES
Kurt Peters, Getreidemarkt 9, Vienna, Austria
No Drawing. Filed Apr. 23, 1957, Ser. No. 654,463
Claims priority, application Austria Apr. 27, 1956
16 Claims. (Cl. 23—23)

This invention relates to a process for separating zirconium and hafnium values.

Zirconium absorbs very few neutrons, and has excellent corrosion resistance. Hafnium, which also has good corrosion resistance, has a high affinity for neutrons. Thus, both zirconium and hafnium are useful as construction materials for atomic reactors, for example, the zirconium finding application as cladding material and the hafnium being employed in control elements. These metals are generally obtained from the same ores and must be separated from each other if the neutrons absorption characteristics of these materials are to be utilized. Since hafnium has a capture cross section for thermal neutrons approximately 200 times greater than that for zirconium, slight traces of hafnium in zirconium seriously decrease the effectiveness of the metal for purposes where low neutron absorption is important. The zirconium must have a high degree of purity, therefore, if it is to be used in an atomic reactor.

Methods presently available for separating these materials both quantitatively and qualitatively require many repetitious operations and generally complicated procedure.

It it an object of this invention to provide a process for the separation of zirconium and hafnium values.

It is another object to provide a process for preparing zirconium substantially free from hafnium.

Other objects will be apparent from the subsequent disclosure and appended claims.

The objects are achieved by the discovery that a solution wherein hafnium and zirconium are present as oxalato complex ions may be treated according to the general techniques of fractional precipitation so as to quantitatively and qualitatively effect the separation of the hafnium and zirconium values. The invention may be more easily understood by the following general procedure.

The ore, or other mixture of zirconium and hafnium values, is treated so as to convert the zirconium and hafnium values to either the phosphates or hydroxides of these metals. In the subsequent description it is assumed that the metal values are converted to phosphates. However, the assumption is made for ease of illustration and is not a limitation on the subject process.

The zirconium-hafnium phosphates are treated with an amount of oxalic acid just sufficient to peptize the phosphate mixture. The resultant colloid is treated with a second portion of oxalic acid in an amount sufficient to effect the conversion of the colloidal material to a phosphato oxalato compound wherein the valence of the metal values are partly satisfied by oxalate ions and partly by phosphate ions. The acid is preferably added in an amount equal to the first portion. These complex compounds are more stable than the colloidal materials of the first step which tend to flock out as highly voluminous precipitates which are difficult to filter. Adding the second portion of oxalic acid at about water bath temperature, i.e., at an elevated temperature up to about 100° C., and preferably 40° C. to 60° C., serves to further stabilize these complex compounds.

The complex phosphato-oxalato compounds are maintained at water bath temperature until the phosphate ions in the complex compounds are replaced by oxalate ions. The resultant solution contains the metal values as oxalato complex ions. These complex ions are quite stable and resist decomposition from dilution or boiling.

The complex ion-containing solution is then subjected to fractional precipitation treatment in a homogeneous environment. As a result of the stability of the complex ions, it is not possible to effect the precipitation by dilution with 20° C. water or with boiling water, or by treatment with ammonium carbonate or respectively ammonium oxalate, oxalic acid and dilute hydrochloric acid (1:6). If stronger hydrochloric acid is added (1:3) precipitation will commence after a few minutes.

Fractional precipitation from a homogeneous environment is realized by carrying out the changes of environmental conditions very slowly just to the point where precipitation will occur with no further change of conditions.

Throughout the treatment of the solution, the main consideration is to maintain a homogeneous solution. Gradations of concentration, pH, temperature, etc., should be minimized within the system. Intensive agitation is helpful in this respect. In addition, the addition of reagents in spray or aerosol form is preferred to addition of the reagents in large drops. Slow addition of the reagents in small amounts is also beneficial.

The precipitation treatment should be stopped prior to the appearance of visible turbidity for good separation. At the point where visible turbidity appears, the diameter of the particles is of the order of $10^{-5}$ centimeters, and the particles consist of several thousand molecular layers; decisive defects in the particles may have already occurred. Thus it is preferable to stop the precipitation treatment at the first point, or as close thereto as is possible, where the precipitation will continue without additional precipitation treatment. This point will hereinafter be referred to as the threshold point. One method which may be employed to effect precipitation, at, or near, the threshold point is to change the variables of the system such that the threshold point is exceeded, as shown by the beginning of visible turbidity, or by the Tyndall effect, adjusting the system so as to just redisssolve the crystal nuclei, and then again reverse the system by very slight, incremental changes in the variables whereby precipitation is effected. For example, a precipitating agent may be added until turbidity is observed. By raising the temperature slightly, the crystal nuclei may be redissolved. Subsequent seeding of the solution with crystal nuclei of hafnium phosphate, the precipitate in the usual treatment, coupled with a very gradual cooling of the solution causes precipitation at, or near, the threshold point.

In order to save time during treatment, the environmental conditions such as pH, temperature, etc., may be changed rapidly up to the threshold point provided the values at the threshold point are not exceeded; subsequent changes should then be in small increments as discussed previously.

Failure to maintain homogeneous conditions and to alter the environmental conditions in small increments may give rise to an incomplete separation and a contaminated product since the values of the variables at the threshold point of each of the metals to be separated may differ by only minor amounts, e.g., only a few hundredths of one pH unit.

In approaching the threshold point during separation by crystallization or precipitation, when continuous and vigorous agitation of the reaction mixture are employed, the most advantageous rates of change of the environmental conditions are shown in Table I.

Table I

| Variables: | Preferred maximum rate of change |
|---|---|
| Temperature | 0.1° C. per minute. |
| pH | 0.1 pH unit per hour. |
| Concentration of ions | 1 relative percent per hour. |

Throughout the separations, dilute solutions containing less than 50 grams per liter, and preferably between 1 and 10 grams per liter, of the elements to be separated (calculated as oxides) are preferred.

In general, the preferred precipitating reagents are mineral acid solutions. If the oxalato complexes are prepared directly from the phosphates, a mineral acid solution, preferably of hydrochloric acid, of ammonium oxalate is particularly suitable for effecting the fractional precipitation.

Similarly, when the oxalato complexes are prepared from hydroxides, good results are obtained by employing phosphoric acid or a mineral acid solution of soluble phosphates as the precipitating agent. The most satisfactory solution in this case is a phosphoric acid solution having a concentration up to about 5 percent, or a mineral acid solution of water-soluble phosphates containing the equivalent concentration of phosphate ions.

Other suitable precipitating agents include arsenic acid and selenic acid. The first fraction resulting from the precipitation treatment is more concentrated in hafnium whereas the last fraction is more concentrated in zirconium.

In an example of the invention one part of a mixture of zirconium and hafnium oxides was dissolved in 10 parts by weight of fused potassium hydrosulfate. The temperature was slowly increased to 400° C. and was finally brought to a clear melt at 900° C. and maintained at this temperature for a few minutes. The melt was cooled and dissolved in 5 percent sulfuric acid. Treatment of the solution with ammonium hydroxide at 40° C. precipitated the zirconium and hafnium values as hydroxides. After a few hours the supernatent liquid was decanted and the precipitate was dissolved at about 30° C. in a solution of hydrochloric acid containing one part of acid to three parts of water. The final solution was subsequently heated to 80° C. whereupon a solution of radioactive hafnium (mass number 181) oxychloride was added in an amount such that the detectable hafnium concentration based on radioactivity measurements was 1 part per thousand.

Zirconium-hafnium phosphate was then precipitated by adding to the oxychloride solution a 20 percent solution of ammonium dihydrogen orthophosphate at 40° C. with stirring. The precipitate was washed free of phosphate ions and treated with sufficient 10 percent oxalic acid to completely peptize the precipitate. A second portion of oxalic acid of about the same amount was added and the solution was heated to a temperature in the range of 40° C. to 45° C. on a water bath for several days. At the first signs of turbidity, additional oxalic acid was added.

The solution was then subjected to fractional precipitation treatment. In order to maintain a substantially homogeneous environment throughout the precipitation, the precipitation vessel was placed in a water bath which was maintained at 70° C., a glass electrode was employed for pH control, a slit cock burette with a finely drawn-out tip was used for addition of the precipitating agent, and a turbo-stirrer was employed to furnish vigorous agitation. The precipitating agent, a mixture of hydrochloric acid and a cold-saturated ammonium oxalate solution, was added at 70° C. to the complex ion-containing solution in the reaction vessel. The addition was continued until a weak opalescence appeared at which point the addition was stopped but the vigorous agitation was continued. The weak turbidity increased to a distinct precipitate. Cold-saturated ammonium oxalate was added dropwise until the turbidity just disappeared. More of the precipitating agent was added at a rate not exceeding 1 cubic centimeter per minute. As turbidity again became noticeable the addition was discontinued; for the next two hours, however, agitation and temperature were maintained as before. The solution was maintained at 70° C. for still another two hours at the end of which time the precipitate was separated, filtered, and washed. This procedure was repeated to obtain subsequent fractions. The composition of the various fractions obtained by the above procedure are shown in Table II.

The precipitating agent comprised 3 parts of cold-saturated (about 4.6 percent) ammonium oxalate and 7 parts of a solution of hydrochloric acid which contains 1 part of acid to 2 parts of water.

Table II

| Fraction | Composition, percent | |
|---|---|---|
| | $HfO_2$ | $ZrO_2$ |
| 1 | 84.64 | 15.36 |
| 2 | 34.60 | 65.40 |
| 3 | 11.17 | 88.83 |
| 4 | 5.47 | 94.53 |
| 5 | 1.74 | 98.26 |
| 6 | 0.57 | 99.43 |
| 7 | 0.11 | 99.89 |

Other separations wherein the oxalate complex ions were not permitted to completely mature were not as effective. For example, in one such separation the first fraction contained only about 22 percent $HfO_2$.

In another example a contaminated zirconium oxide was purified in the following manner. One part of the contaminated oxide was treated with six parts of a mixture consisting of six parts of sodium carbonate and one part of sodium nitrate at 1000° C., thereby converting zirconium, hafnium and titanium into the water-insoluble zirconate, hafniate, and titanate, respectively; aluminum and the rare earth metals remained in the mixture as water-soluble compounds. The mixture was leached with water; the insoluble zirconate, hafniate and titanate residue was ignited with potassium pyrosulfate at a dark red heat. The fused mass was dissolved in 5 percent sulfuric acid with the addition of hydrogen peroxide. Subsequent digestion with sodium thiosulfate precipitated the zirconium and hafnium as hydroxides whereas the titanium remained in solution as pertitanic acid. Any iron present in the sample also remained in solution. The insoluble hydroxides were separated from the solution, dissolved in hydrochloric acid, and the metal values precipitated as phosphates with ammonium phosphate. The phosphates were separated and digested with 10 percent oxalic acid at a temperature in the range of 30° C. to 35° C. whereby the metal values were converted to oxalato complex ions. To this solution was added, at a temperature of 70° C. to 80° C., with intensive stirring a mixture consisting of 7 parts of concentrated hydrochloric acid and 3 parts of ammonium oxalate. The precipitation was effected in three fractions. The first two fractions contained substantially all of the hafnium in a high degree of purity. The third fraction contained all of the zirconium. A considerable amount of the precipitating solution must be added after the hafnium has precipitated to effect the precipitation of the zirconium; the effectiveness of separation is thereby enhanced since simultaneous precipitation is minimized.

What is claimed is:

1. A process for separating zirconium and hafnium values which comprises treating a mixture of zirconium and hafnium insoluble compounds with sufficient oxalic acid solution to peptize said insoluble zirconium and hafnium compounds, said mixture of zirconium and hafnium insoluble compounds being selected from the group consisting of mixtures of zirconium and hafnium phosphates and mixtures of zirconium and hafnium hydroxides; digesting said peptized mixture at an elevated temperature not exceeding 100° C. with sufficient oxalic acid solution to convert the hafnium and zirconium values to oxalato complex ions; and fractionally precipitating the zirconium and hafnium values from the oxalato complex ion-containing solution by selectively adjusting gradually at least one of the process variables including temperature, pH and ion concentration in a direction favoring insolubility of the zirconium and hafnium values, any gradual adjustment of temperature being a decrease at a rate less than 0.1° C. per minute, any adjustment of pH being an increase at a maximum rate of 0.1 pH unit per hour and any adjustment of ion-concentration being at a maximum rate of 1 relative percent per hour, and continuing said gradual adjustment of at least one process variable until substantially all of the zirconium and hafnium values have been precipitated from solution, the precipitate so produced being removed from the precipitation system during the course of said precipitation in a plurality of portions, the earlier of said portions being substantially richer in hafnium and the latter of said portions being substantially richer in zirconium.

2. A process in accordance with claim 1 wherein the digestion of the peptized salts and the conversion of the digested salts to oxalato complex ions is effected at a temperature in the range of about 40° C. to 60° C.

3. A process in accordance with claim 1 wherein the fractional precipitation is effected at a temperature of about 70° C.

4. A process in accordance with claim 1 wherein the concentration of the oxalic acid is about 10 percent.

5. A process for separating zirconium and hafnium values which comprises treating a mixture of zirconium and hafnium phosphates with sufficient oxalic acid solution to peptize said zirconium and hafnium phosphates; digesting said peptized mixture at an elevated temperature not exceeding 100° C. with sufficient oxalic acid solution to convert the peptized phosphates to oxalato complex ions; and fractionally precipitating the zirconium and hafnium values from the oxalato ion-containing solution by selectively adjusting gradually at least one of the process variables including temperature, pH and ion concentration in a direction favoring insolubility of the zirconium and hafnium values, any gradual adjustment of temperature being a decrease at a rate less than 0.1° C. per minute, any adjustment of pH being an increase at a maximum rate of 0.1 pH unit per hour and any adjustment of ion-concentration being at a maximum rate of 1 relative percent per hour and continuing said gradual adjustment of at least one process variable until substantially all of the zirconium and hafnium values have been precipitated from solution, the precipitate so produced being removed from the precipitation system during the course of said precipitation in a plurality of portions, the earlier of said portions being substantially richer in hafnium and the latter of said portions being substantially richer in zirconium.

6. A process in accordance with claim 5 wherein the digestion of the peptized phosphates and the conversion of the digested phosphates to oxalato complex ions is effected at a temperature in the range of about 40° C. to 60° C.

7. A process in accordance with claim 5 wherein the fractional precipitation is effected at a temperature of about 70° C.

8. A process in accordance with claim 5 wherein the concentration of the oxalic acid is about 10 percent.

9. A process in accordance with claim 5 wherein said fractional precipitation is effected by the gradual addition of a strong aqueous mineral acid solution of ammonium oxalate.

10. A process for separating zirconium and hafnium values which comprises treating a mixture of zirconium and hafnium phosphates with sufficient oxalic acid solution to peptize said zirconium and hafnium phosphates, said peptizing being effected at a temperature in the range of about 40° C. to about 60° C., digesting said peptized mixture at a temperature in the range of about 40° C. to about 60° C. with sufficient oxalic acid solution to convert the hafnium and zirconium values to oxalato complex ions, and fractionally precipitating the zirconium and hafnium values from the oxalato complex ion-containing solution by the gradual addition of a strong aqueous mineral acid solution of ammonium oxalate to said oxalato complex ion-containing solution at a rate such that the rate of change of ion concentration does not exceed 1 relative percent per hour, any variation of the pH being at a maximum rate of 0.1 pH unit per hour, said fractional precipitation being conducted at a temperature of about 70° C., and continuing said fractional precipitation until substantially all of the zirconium and hafnium values have been precipitated from solution, the precipitates so produced being removed from the precipitation system in a plurality of portions, the earlier of said portions being substantially richer in hafnium and the latter of said portions being substantially richer in zirconium.

11. A process for separating zirconium and hafnium values which comprises treating a mixture of zirconium and hafnium hydroxides with sufficient oxalic acid solution to peptize said zirconium and hafnium hydroxides; digesting said peptized mixture at an elevated temperature not exceeding 100° C. with sufficient oxalic acid solution to convert the peptized hydroxides to oxalato complex ions; and fractionally precipitating the zirconium and hafnium values from the oxalato ion-containing solution by selectively adjusting gradually at least one of the process variables including temperature, pH and ion concentration in a direction favoring insolubility of the zirconium and hafnium values, any gradual adjustment of temperature being a decrease at a rate less than 0.1° C. per minute, any adjustment of pH being an increase at a maximum rate of 0.1 pH unit per hour and any adjustment of ion-concentration being at a maximum rate of 1 relative percent per hour and continuing said gradual adjustment of at least one process variable until substantially all of the zirconium and hafnium values have been precipitated from solution, the precipitate so produced being removed from the precipitation system during the course of said precipitation in a plurality of portions, the earlier of said portions being substantially richer in hafnium and the latter of said portions being substantially richer in zirconium.

12. A process in accordance with claim 11 wherein the digestion of the peptized hydroxides and the conversion of the digested hydroxides to oxalato complex ions is effected at a temperature in the range of about 40° C. to 60° C.

13. A process in accordance with claim 11 wherein the fractional precipitation is effected at a temperature of about 70° C.

14. A process in accordance with claim 11 wherein the concentration of the oxalic acid is about 10 percent.

15. A process in accordance with claim 11 wherein said fractional precipitation is effected by the gradual addition of an aqueous mineral acid solution of water-soluble phosphates.

16. A process for separating zirconium and hafnium values which comprises treating a mixture of zirconium and hafnium hydroxides with sufficient oxalic acid solution to peptize said zirconium and hafnium hydroxides, said peptizing being effected at a temperature in the range of about 40° C. to about 60° C., digesting said peptized mixture at a temperature in the range of about 40° C. to about 60°C. with sufficient oxalic acid solution to convert the hafnium and zirconium values to oxalato complex ions and fractionally precipitating the zirconium and hafnium values from the oxalato complex ion-containing solution by the gradual addition of an aqueous mineral acid solution of water-soluble phosphates to said oxalato complex ion-containing solution at a rate such that the rate of change of ion concentration does not exceed 1 relative per cent per hour, any variation of temperature during said fractional precipitation being at a maximum rate of 0.1° C. per minute and any variation of the pH being at a maximum rate of 0.1 pH unit per hour and continuing said fractional precipitation until substantially all of the zirconium and hafnium values have been precipitated from solution, the precipitates so produced being removed from the precipitation system in a plurality of portions, the earlier of said portions being substantially richer in hafnium and the latter of said portions being substantially richer in zirconium.

References Cited in the file of this patent

UNITED STATES PATENTS

| | | |
|---|---|---|
| 1,624,162 | De Boer | Apr. 12, 1927 |
| 1,636,493 | Van Arkel et al. | July 19, 1927 |
| 1,658,807 | Kinzie | Feb. 14, 1928 |
| 1,666,811 | De Boer | Apr. 17, 1928 |
| 1,771,557 | De Boer | July 29, 1930 |

FOREIGN PATENTS

| | | |
|---|---|---|
| 220,936 | Great Britain | July 16, 1925 |

OTHER REFERENCES

Connick et al., in U.S. Atomic Energy Comm. publication AECD–2272, Sept. 9, 1948, 57 pages (pages 51 and 52).